H. L. LOVETT.
INTERCHANGEABLE PRICE CARD SECTION.
APPLICATION FILED MAY 18, 1921.
1,395,127.
Patented Oct. 25, 1921.
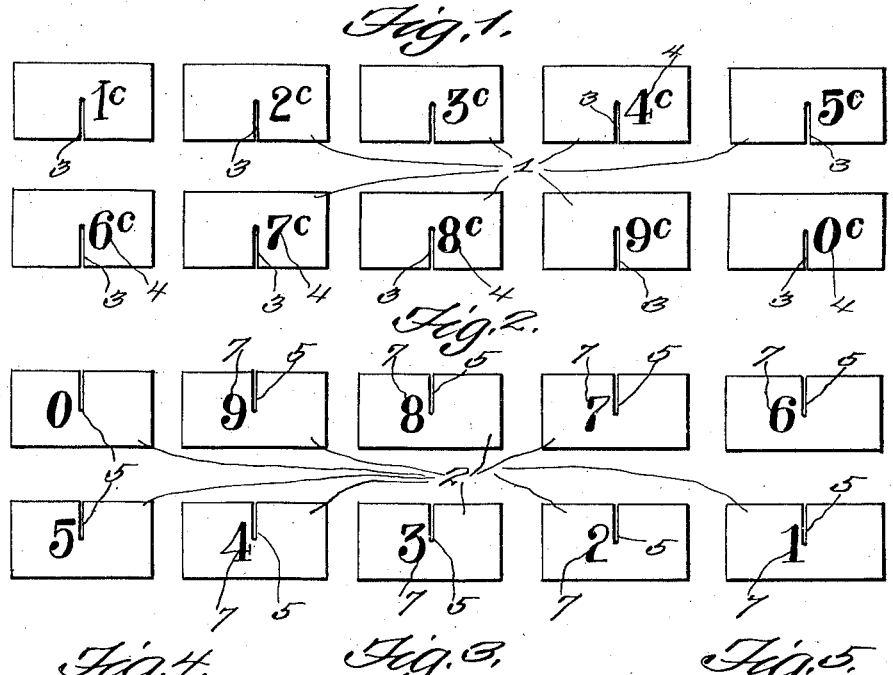
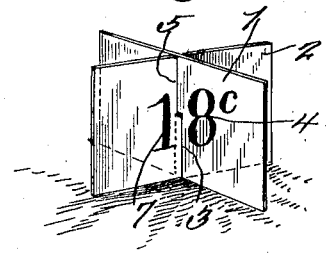
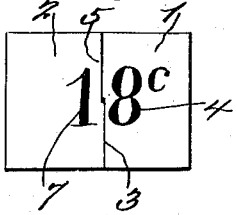
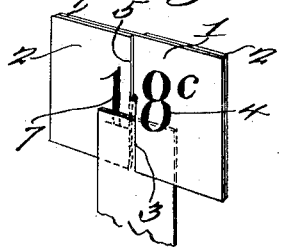
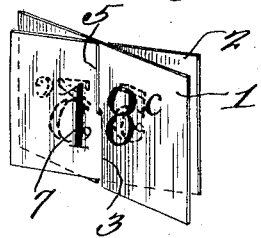
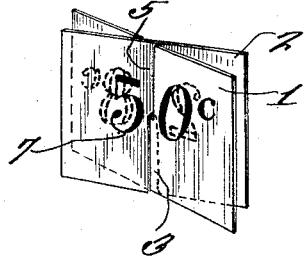
Inventor
Harry L. Lovett,
By Watson E. Coleman
Attorney

UNITED STATES PATENT OFFICE.

HARRY L. LOVETT, OF NASHUA, NEW HAMPSHIRE.

INTERCHANGEABLE PRICE-CARD SECTION.

1,395,127. Specification of Letters Patent. Patented Oct. 25, 1921.

Application filed May 18, 1921. Serial No. 470,731.

*To all whom it may concern:*

Be it known that I, HARRY L. LOVETT, a citizen of the United States, residing at Nashua, in the county of Hillsborough and State of New Hampshire, have invented certain new and useful Improvements in Interchangeable Price-Card Sections, of which the following is a specification, reference being had to the accompanying drawings.

The present invention has for its purpose the provision of a price card particularly adapted for use in various stores, such as grocery and department stores and the like, preferably the latter, and wherein the price card comprises a plurality of sections having numbers and being oppositely slitted, whereby the sections are interchangeable, in order to produce various prices, ranging from one cent to ninety-nine cents.

Another purpose embodies a price card, wherein the sections are oppositely slitted, so that the sections can be partially separated, so as to stand the price card up, as shown in Figure 5, so as to disclose the price.

Still another purpose is the provision of oppositely slitted interchangeable price card sections, whereby the slits of certain of the sections of the card may be used to fasten the price card on the article to be sold, as disclosed in Fig. 5.

A further purpose consists in the provision of a price card, wherein the interchangeable sections have numbers upon the opposite faces of the cards and upon opposite sides of the slits, so as to avoid the necessity of changing the cards in order to alter the price. In order to change the price under such conditions, would simply involve reversing one section relatively to the other, without disconnecting them.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Fig. 1 discloses collective views of price cards numbered from 1 to 9 with a cipher on one side of the slit of the tenth card including cents indications.

Fig. 2 discloses collective views of price card sections with numbers printed thereon upon opposite sides of the sections, so that by connecting the sections with the sections in Fig. 1 the various prices may be produced, for instance such as 19 cents, 15 cents, 10 cents and the like, for instance up to 99 cents.

Fig. 3 is a view showing two of the price card sections connected and disclosing the price of 18 cents.

Fig. 4 is a perspective view, showing the price card sections partially moved, so that the sections will act to support the price card in position on an article to be sold.

Fig. 5 is a view showing the slit of one of the card sections used for fastening the price card on an article to be sold.

Fig. 6 discloses views of two price card sections, with numbers upon opposite faces of the sections and upon opposite sides of the interengaging slits, certain of the cards being on the reversed faces being shown in dotted lines, whereby the card sections may be reversed without disconnecting them.

Fig. 7 is a view showing the cards in Fig. 6 as connected, disclosing a certain price for which an article might be sold, indicating the numbers in dotted lines on the reversed faces of the card sections.

Referring to the drawings, 1 and 2 designate two series of price card sections, and each of the sections 1 is provided with a slit 3 midway its ends extending substantially half the width of the section, and provided with a number 4, such as 7 cents, 5 cents or 6 cents, or any number from 1 to 9, and a cipher, as shown in the group of card sections in Fig. 1.

The group of price card sections in Fig. 2 are each provided with a slit 5 midway its ends, which extends substantially half the width of the card of the card section. The card sections (Fig. 2) are provided with numbers 7 from 1 to 9 and including a cipher on the left hand side of the slit 5. It will be noted that the two groups of card sections in Figs. 1 and 2 are oppositely slitted, so that any two card sections of the two groups may be connected and interchanged with other of the card sections, so as to produce various prices for which articles might be sold. In Figs. 3, 4 and 5 certain of the card sections of the two groups are connected so as to produce the price 18 cents, it being noted that in Fig. 4 the sections are partly moved so as to support the price card on an article to be sold. Furthermore in Fig. 5 the slit of the card section with the group in Fig. 1 is employed to engage the article to be sold, so as to support the price card in position.

In Figs. 6 and 7 the price card sections are identical in construction to those in the groups of Figs. 1 and 2, with the exception that numbers are provided on the reverse faces of the cards, and upon opposite sides of their respective slits so that the price card sections need only be reversed for the purpose of changing the price of an article to be sold, without disconnecting the card sections, and without interchanging them with other card sections.

The price card sections in Figs. 6 and 7 may be in groups, such as shown in Figs. 1 and 2. Furthermore the various numbers upon the price card sections may be varied, or increased, from 9 and so on, for instance 10, 11, 12 and 13 and so on on the right and left hand sides of the slits, whereby various prices beyond 99 cents may be produced.

The invention having been set forth, what is claimed as being useful is:

1. A price card, comprising a pair of sections, which are oppositely slitted and being interchangeable with other similar card sections, and provided with numbers, whereby upon interchanging the sections with other similar sections different prices may be produced.

2. In an article as set forth and for the purpose indicated, a plurality of groups of price card sections, the cards of both groups being oppositely slitted substantially at points midway their ends for substantially half their widths, numbers on the right hand sides of the slits of the cards of one group including cents indications, the price card sections of the other groups having numbers on the left hand sides of the slits, whereby upon interchanging or connecting the various cards of both groups, a plurality of prices for the articles to be sold may be produced.

3. As an article of manufacture, a device for the purpose indicated consisting of groups of price card sections, said cards being oppositely slitted substantially midway their ends, said slits extending substantially half the width of the sections, the cards of both groups having numbers upon their opposite faces and upon opposite sides of their slits, the numbers upon the right hand sides of either face of each section including cents indications, whereby the sections may be interchanged and connected, for the purpose of producing a plurality of various prices.

4. A price card, comprising a plurality of groups of price card sections, the cards of both groups being oppositely slitted, whereby the cards of one group may be interconnected and interchangeable with the cards of the other group, the price card sections having price marked indicia on either face and on either side of the slit, whereby upon interchanging the sections of one group with the sections of the other group different prices may be produced.

In testimony whereof I hereunto affix my signature.

HARRY L. LOVETT.